(12) United States Patent
Newcombe

(10) Patent No.: US 8,071,055 B2
(45) Date of Patent: Dec. 6, 2011

(54) WATER TREATMENT TECHNIQUES

(75) Inventor: Remembrance Newcombe, Hayden, ID (US)

(73) Assignee: Blue Water Technologies, Inc., Hayden, ID (US)

( * ) Notice: Subject to any disclaimer, the term of this patent is extended or adjusted under 35 U.S.C. 154(b) by 229 days.

(21) Appl. No.: 11/627,896

(22) Filed: Jan. 26, 2007

(65) Prior Publication Data

US 2007/0163958 A1 Jul. 19, 2007

Related U.S. Application Data

(63) Continuation-in-part of application No. 10/727,963, filed on Dec. 3, 2003, now Pat. No. 7,399,416, application No. 11/627,896, which is a continuation-in-part of application No. 11/171,002, filed on Jun. 29, 2005, now Pat. No. 7,445,721.

(60) Provisional application No. 60/763,540, filed on Jan. 30, 2006, provisional application No. 60/430,756, filed on Dec. 4, 2002, provisional application No. 60/583,979, filed on Jun. 30, 2004.

(51) Int. Cl.
*C02F 1/28* (2006.01)
*B01J 39/10* (2006.01)

(52) U.S. Cl. ........ 422/534; 210/106; 210/107; 210/348; 210/355; 210/391; 210/650; 210/670

(58) Field of Classification Search ............... 210/748, 210/760, 763, 749, 758, 600, 650, 663, 106, 210/107, 348, 355, 391, 670; 422/534

See application file for complete search history.

(56) References Cited

U.S. PATENT DOCUMENTS

| 2,528,099 A | 10/1950 | Wilcox |
| 2,696,462 A | 12/1954 | Bodkin |
| 2,730,239 A | 1/1956 | Peery |
| 2,863,829 A | 12/1958 | Henke et al. |
| 3,056,743 A | 10/1962 | Eichhorn et al. |
| 3,499,837 A | 3/1970 | Jaunarajs |
| 3,537,582 A | 11/1970 | Demeter |
| 3,619,425 A | 11/1971 | Palaiseau et al. |
| 3,674,684 A | 7/1972 | Gollan |
| 3,679,581 A | 7/1972 | Kunz |
| 3,959,133 A | 5/1976 | Fulton |

(Continued)

FOREIGN PATENT DOCUMENTS

DE 2724254 11/1978
(Continued)

OTHER PUBLICATIONS

Wouter, "Effluent polishing at Sewage Works Ruurlo and Wehl, The Netherlands" "H2O", 1999, Unknown, #19, The Netherlands.

(Continued)

*Primary Examiner* — Nam Nguyen
*Assistant Examiner* — Cameron J Allen
(74) *Attorney, Agent, or Firm* — Paul W. Mitchell

(57) ABSTRACT

Exemplary systems and techniques for treating contaminated water are described. In one instance a plant or system includes a membrane filtration mechanism operable to receive an influent water stream containing a contaminant and to separate at least a first portion of the contaminant from a resulting first effluent water stream. The system also includes a reactive filtration mechanism operable to receive the first effluent water stream and to remove a waste stream containing a second portion of the contaminant to produce a resultant second effluent stream.

14 Claims, 6 Drawing Sheets

U.S. PATENT DOCUMENTS

| | | | |
|---|---|---|---|
| 4,003,832 | A | 1/1977 | Henderson et al. |
| 4,049,545 | A | 9/1977 | Horvath |
| 4,126,546 | A | 11/1978 | Hjelmner et al. |
| 4,145,280 | A | 3/1979 | Middelbeek et al. |
| 4,269,716 | A | 5/1981 | Gurian |
| 4,366,128 | A | 12/1982 | Weir et al. |
| 4,448,696 | A | 5/1984 | White, Jr. |
| 4,689,154 | A | 8/1987 | Zimberg |
| 4,732,879 | A | 3/1988 | Kalinowski et al. |
| 4,842,744 | A | 6/1989 | Schade |
| 5,087,374 | A | 2/1992 | Ding |
| 5,102,556 | A | 4/1992 | Wong |
| 5,173,194 | A | 12/1992 | Hering et al. |
| 5,190,659 | A | 3/1993 | Wang et al. |
| 5,236,595 | A * | 8/1993 | Wang et al. .................. 210/669 |
| 5,302,356 | A | 4/1994 | Shadman et al. |
| 5,304,309 | A | 4/1994 | Sengupta |
| 5,369,072 | A | 11/1994 | Benjamin et al. |
| 5,372,720 | A | 12/1994 | Jonsson |
| 5,439,595 | A | 8/1995 | Downey, Jr. |
| 5,443,729 | A | 8/1995 | Sly et al. |
| 5,454,959 | A | 10/1995 | Stevens |
| 5,534,153 | A | 7/1996 | Scott et al. |
| 5,573,666 | A | 11/1996 | Korin |
| 5,670,046 | A | 9/1997 | Kimmel |
| 5,674,402 | A | 10/1997 | Nilsson et al. |
| 5,676,257 | A | 10/1997 | Adkins |
| 5,679,257 | A | 10/1997 | Coate et al. |
| 5,707,528 | A | 1/1998 | Berry |
| 5,746,913 | A | 5/1998 | Chang et al. |
| 5,755,977 | A | 5/1998 | Gurol et al. |
| 5,843,308 | A | 12/1998 | Suozzo et al. |
| 5,855,787 | A * | 1/1999 | Giori ............................ 210/651 |
| 5,876,606 | A | 3/1999 | Blowes et al. |
| 5,904,855 | A | 5/1999 | Manz et al. |
| 5,911,882 | A | 6/1999 | Benjamin et al. |
| 6,077,446 | A | 6/2000 | Steiner et al. |
| 6,132,623 | A | 10/2000 | Nikolaidis et al. |
| 6,143,186 | A | 11/2000 | Van Unen |
| 6,200,482 | B1 | 3/2001 | Winchester et al. |
| 6,217,765 | B1 | 4/2001 | Yamasaki et al. |
| 6,319,412 | B1 | 11/2001 | Reyna |
| 6,334,956 | B1 | 1/2002 | Hanemaaijer |
| 6,387,264 | B1 | 5/2002 | Baur |
| 6,426,005 | B1 | 7/2002 | Larsson |
| 6,432,312 | B1 | 8/2002 | Fuss |
| 6,464,877 | B1 | 10/2002 | Mori et al. |
| 6,468,942 | B1 | 10/2002 | Sansalone |
| 6,471,857 | B1 | 10/2002 | Kaibara |
| 6,495,047 | B1 | 12/2002 | SenGupta et al. |
| 6,630,071 | B1 | 10/2003 | Buisman |
| 6,663,781 | B1 | 12/2003 | Huling et al. |
| 6,716,344 | B1 | 4/2004 | Bassi et al. |
| 6,942,786 | B1 | 9/2005 | Fosseng |
| 6,942,807 | B1 | 9/2005 | Meng et al. |
| 6,982,036 | B2 | 1/2006 | Johnson |
| 7,029,589 | B2 | 4/2006 | McGinness |
| 7,399,416 | B2 | 7/2008 | Moller et al. |
| 7,445,721 | B2 | 11/2008 | Moller |
| 7,713,423 | B2 | 5/2010 | Moller et al. |
| 7,713,426 | B2 | 5/2010 | Newcombe |
| 7,744,764 | B2 | 6/2010 | Moller et al. |
| 2001/0052495 | A1* | 12/2001 | Friot ............................ 210/660 |
| 2002/0003116 | A1* | 1/2002 | Golden ........................ 210/759 |
| 2002/0077249 | A1 | 6/2002 | Schlegel et al. |
| 2002/0088759 | A1 | 7/2002 | Krulik et al. |
| 2004/0144728 | A1 | 7/2004 | Moller et al. |
| 2004/0188348 | A1 | 9/2004 | Yamasaki et al. |
| 2004/0222162 | A1 | 11/2004 | Lee et al. |
| 2005/0127003 | A1 | 6/2005 | Dennis |
| 2005/0173348 | A1 | 8/2005 | Drake |
| 2005/0263447 | A1 | 12/2005 | McGrew, Jr. |
| 2006/0000784 | A1 | 1/2006 | Khudenko |
| 2006/0000785 | A1 | 1/2006 | Moller |
| 2007/0136919 | P1 | 6/2007 | Bak et al. |
| 2007/0187329 | A1 | 8/2007 | Moller et al. |

FOREIGN PATENT DOCUMENTS

| | | |
|---|---|---|
| GB | 471277 | 9/1937 |
| GB | 1596205 | 8/1981 |
| JP | 03137990 A | 6/1991 |
| JP | 7-232161 | 5/1995 |
| JP | 7-232161 | 9/1995 |
| JP | 20010070954 | 3/2001 |
| JP | 2002-159977 | 4/2002 |
| JP | 2002-159977 | 6/2002 |
| WO | WO0110786 | 2/2001 |
| WO | W02004050561 | 6/2004 |

OTHER PUBLICATIONS

Beltran, "Ozone Reaction Kinetics for Wastewater Systems", Heterogeneous Catalytic Ozonation, 2004, Chapter 10, Lewis Publishers, pp. 227-276.

Ravikumat et al., "Chemical Oxidation of Chlorinated Organics by Hydrogen Peroxide in the Presence of Sand", Envior. Sci. Technol. Department of Chemical Engineering and Environmental Studies Institute, Drexel University, Philadelphia, PA. 1994. pp. 394-400, vol. 28, No. 3.

Dzombak, D. A. et al., Surface Complexation Modeling, 1990; John Wiley & Sons; New York, NY.

Arai, Y. et al., "ATR-FTIR Spectroscopic Investigation on Phosphate Adsorption Mechanisms at the Ferrihydrite-Water Interface", *J. Colloid Interface Sci.* Retrieved from http://ag.udel.edu/soilchem/arai01bjcis.pdf 2001, pp. 241, 317-326.

Benjamin, Mark M. et al., "Sorption and Filtration of Metals Using Iron-Oxide-Coated Sand", May 1, 1996, pp. 1-13.

Gustafsson, John P., "Modelling Molybdate and Tungstate Adsorption to Ferrihydrite", *Chemical Geology*—vol. 200, Issues 1-2, Oct. 16, 2003 Retrieved from <<http://www.sciencedirect.com/science?_ob=ArticleURL&_udi=B6V5Y-48TMHH4-3&_user=10 &_rdoc=1&_fmt=&_orig=search&_sort=d&_docanchor= &view=c&_searchStrld=1066144960&_rerunOrigin=google&_ acct=C000050221&_version=1&_urlVersion=0&_userid=10 &md5=3a Jul. 11, 2003, pp. 105-115.

Gustafsson, John P., "Visual MINTEQ. MINTEQA2 4.0", *Royal Institution of Technology Land and Water Resources Engineering*; Stockholm, Sweden 2006.

Hermanowicz, S. W., "Chemical Phosphorus Removal", *Biological and Chemical Systems for Nutrient Removal; Water Environment Federation*: Alexandria, Virginia, 39. 2005, p. 39.

International Organization for, Standardization, "Water Quality—Determination of Nitrogen—Part 2: Determination of Bound Nitrogen, After Combustion and Oxidation to Nitrogen Dioxide, Chemiluminescence Detection", *ISOm 11905-2*; Geneva, Switzerland Retrieved from <<http://www.saiglobal.com/PDFTemp/Previews/OSH/ISO/ISO_12345_03-01/T023630E.PDF>> Mar. 15, 1997, pp. 1-5.

Ivanov, V. et al., "Phosphate Removal from the Returned Liquor of Municipal Wastewater Treatment Plant Using Iron-Reducing Bacteria", *J. Appl. Microbiol* 2005, pp. 98, 1152-1161.

Jenkins, D., "Chemical Processes for Phosphate Removal", *Water Res.* Retrieved from <<http://books.google.com/books?id=bBSRPv87Ms8C&pg=PA94&lpg=PA94 &dq=%22chemical+processes+for+phosphate+removal%22 &source=bl&ots=kVPUAz08Jp&sig=keK-5nOkxZZdx4itR2_Jd_ YNcfE&hl=en&ei=gF7nSsCCLpCMtAPEz9iIBQ&sa=X &oi=book_result&ct=result&resnum= 1991, pp. 5, 369-387.

Joshi, Arun et al., "Removal of Arsenic from Ground Water by Iron Oxide-Coated Sand", Aug. 1, 1996, pp. 1-4.

Khare, N. et al., "XANES Determination of Adsorbed Phosphate Distribution between Ferrihydrite and Boehmite in Mixtures", *Published in Soil Sci. Soc. Am. J. 68:460-469* (2004). Retrieved from <<http://soil.scijournals.org/cgi/content/abstract/68/2/460>> 2004, pp. 68, 460-469.

Leaf, William et al., "Evaluation of Blue PRO Process at the Hayden Wastewater Research Facility—Final Summary Report No. 331243. 01.RP", *CH2M HILL*; Denver, CO, July Retrieved from <<http://cforjustice.org/wp-content/uploads/2008/12/hayden-3rd-party-blue-pro-report.pdf>> Jul. 12, 2006, pp. 1-21.

Lo, Shang-Lien et al., "Characteristics and Adsorption Properties of Iron-Coated Sand", pp. 1-9.

Lovley, Derek. R. et al., "Organic Matter Mineralization with Reduction of Ferric Iron in Anaerobic Sediments", *Applied and Environmental Microbiology*, Apr. 1986 Retrieved from <<http://www.ncbi.nlm.nih.gov/pmc/articles/PMC238947/pdf/aem00139-0019.pdf>> Apr. 1986, pp. 51, 683-689.

Matott, L. S., "IsoFit Version 1.0", *State University of New York at Buffalo* 2004.

Meima, J. A. et al., "Application of Surface Complexation/Precipitation Modeling to Contaminant Leaching from Weathered Municipal Solid Waste Incinerator Bottom Ash", *Environ. Sci. Technol.* 1998, pp. 32, 688-693.

Newcombe, R. L. et al., "Arsenic Removal from Drinking Water by Moving Bed Active Filtration", *J. Environ. Eng.* 2006, pp. 132, 5-12.

Newcombe, R.L. et al., "Phosphorus Removal from Municipal Wastewater by Hydrous Ferric Oxide Reactive Filtration and Coupled Chemically Enhanced Secondary Treatment: Part 1-Performance", Mar. 1, 2008, pp. 1-9.

Newcombe, R. L. et al., "Phosphorus Removal from Municipal Wastewater by Hydrous Ferric Oxide Reactive Filtration and Coupled Chemically Enhanced Secondary Treatment: Part II-Mechanism", Mar. 1, 2008.

Nowack, Bernd et al., "Modeling the Adsorption of Metal-EDTA Complexes onto Oxides", *Environ. Sci. Technol*. Retrieved from <<http://www.empa.ch/plugin/template/empa/*/78480/---/I=2>> 1996, pp. 30, 2397-2405.

Parfitt, R. L. et al., "The Mechanism of Phosphate Gixation by Iron Oxides", *Soil Sci. Soc. Am. Proc.* 1975, pp. 39, 837-841.

Parker, Denny S. et al., "The Future of Chemically Enhanced Primary Treatment: Evolution Not Revolution", Retrieved from <<http://www.cd3wd.com/cd3wd_40/ASDB_SMARTSAN/CEPT-Debate-2.pdf>> Mar. 15, 2001.

Pestovsky, Oleg et al., "Aqueous Ferryl(IV) Ion: Kinetics of Oxygen Atom Transfer to Substrates and Oxo Exchange with Solvent water", *Inorganic Chemistry Article; Inorg. Chem. 2006, 45, 814-820* Oct. 27, 2005, pp. 814-820.

Schwertman, U. et al., "Iron Oxides in the Laboratory: Preparation and Characterization", *Wiley-VCH: Weinheim, Hermany* 2000.

Sigg, L. et al., "The Interaction of Anions and Weak Acids with the Hydrous Goethite Surface", *Colloids Surf.* 1980, pp. 2, 101-107.

Smith, S. et al., "The Significance of Chemical Phosphorus Removal Theory for Engineering Practice", 2007, pp. 1-24.

Stabnikov, V. P. et al., "Effect of Iron Hydroxide on Phosphate Removal During Anaerobic Digestion of Activated Sludge", *Appl. Biochem. Microbiol.* 2004, pp. 40, 376-380.

Thirunavukkarasu, O. S. et al., "Removal of Arsenic in Drinking Water by Iron Oxide-Coated Sand and Ferrihydrite—Batch Studies", pp. 1-17.

Basibuyuk, M. et al.; "Use of waterworks sludge, ferric chloride and alum for the treatment of paper mill wastewater"; *Asian Journal of Chemistry*; vol. 16, No. 1; 2004; pp. 103-112.

Basibuyuk, M. et al.; "The use of waterworks sludge for the treatment of dye wastes"; *Environmental Technology*; vol. 23, No. 3; 2002; pp. 345-351.

Gregory, J. et al.; "Hydrolyzing metal salts as coagulants"; *Pure and Applied Chemistry*; vol. 73, No. 12; 2001; pp. 2017-2026.

Guven, E.; "Granulation in Thermophilic Aerobic Wastewater Treatment"; Ph.D. Dissertation; Marquette University; 2004.

Jiang, J.Q. et al.; "Pre-polymerised inorganic coagulants and phosphorus removal by coagulation—A review"; *Water SA*; vol. 24, No. 3; Jul. 3, 1998; 2pp. 237-244.

Kornmuller, A. et al.; "Adsorption of reactive dyes to granulated iron hydroxide and its oxidative regeneration"; *Water Science and Technology*; vol. 46, No. 4-5; 2002; pp. 43-50.

Lee, J.W. et al.; "Comparative studies on coagulation and adsorption as a pretreatment method for the performance improvement of submerged MF membrane for secondary domestic wastewater treatment"; *Separation Science and Technology*; vol. 40, No. 13; 2005; pp. 2613-2632.

Lijklema, L.; "Interaction of Ortho-Phosphate With Iron(III) and Aluminum Hydroxides"; *Environmental Science & Technology*; vol. 14, No. 5; 1980; pp. 537-541.

Robertson, W.D.; "Treatment of wastewater phosphate by reductive dissolution of iron"; *Journal of Environmental Quality*; vol. 29, No. 5; 2000; pp. 1678-1685.

Sari, B. et al.; "Use of fly ash as a potential coagulant in the physicochemiical treatment of domestic wastewater"; *Turkish Journal of Engineering and Environmental Sciences*; vol. 26, No. 2; 2002; pp. 65-74.

Shon, H.K. et al.; "Effect of partial flocculation and adsorption as pretreatment to ultrafiltration"; *AIChE Journal*; vol. 52, No. 1; 2006; pp. 207-216.

Shon, H.K. et al.; "Is semi-flocculation effective as pretreatment to ultrafiltration in wastewater treatment?"; *Water Research*; vol. 39, No. 1; Jan. 2005; pp. 147-153.

Xu, G.R., et al.; "Adsorbent obtained from CEPT sludge in wastewater chemically enhanced treatment"; *Water Research*; vol. 39, No. 20; Dec. 2005; pp. 5175-5185.

Zeng, L. et al.; "Adsorptive removal of phosphate from aqueous solutions using iron oxide tailings"; *Water Research*; vol. 38, No. 5; Mar. 2004; pp. 1318-1326.

Genz, A. et al.; "Advanced phosphorus removal from membrane filtrates by adsorption on activated aluminium oxide and granulated ferric hydroxide"; *Water Research*; vol. 38, No. 16; 2004; pp. 3523-3530.

Gnirss, R. et al.; "Cost effective and advanced phosphorus removal in membrane bioreactors for a decentralized wastewater technology"; *Water Science and Technology*; vol. 47, No. 12; 2003; pp. 133-139.

PCT Application PCT/US03/40056; International Search Report dated Apr. 27, 2004.

EPO Application 07001983.1; Search and Examination Report dated Mar. 11, 2008.

EPO Application 03799926.5; Examination Report dated Feb. 22, 2006.

* cited by examiner

WATER TREATMENT TECHNIQUES

CROSS-REFERENCE TO RELATED APPLICATIONS

The present patent application claims priority to U.S. Provisional Patent Application No. 60/763,540, filed Jan. 30, 2006 and entitled "Water Treatment System and Method." The present patent application is also a continuation-in-part of, and claims priority from, U.S. patent application Ser. No. 10/727,963, filed Dec. 3, 2003 and entitled "Reactive Filtration" which claims the benefit of U.S. Provisional Patent Application 60/430,756, filed Dec. 4, 2002. The present patent application is also a continuation-in-part of, and claims priority from, U.S. patent application Ser. No. 11/171,002, filed Jun. 29, 2005 and entitled "Reactive Filtration" which claims the benefit of U.S. Provisional Patent Application 60/583,979, filed Jun. 30, 2004. The disclosures of the above mentioned patent applications are incorporated herein by reference in their entireties.

BACKGROUND

Various techniques are known for removing contaminants from water streams, such as wastewater streams and drinking water streams. However, these techniques are often uneconomical to employ and/or lack a desired efficacy.

SUMMARY

Exemplary systems, methods, and techniques for treating contaminated water are described. In one instance a plant or system includes a membrane filtration mechanism operable to receive an influent water stream containing a contaminant and to separate at least a first portion of the contaminant from a resulting first effluent water stream. The system also includes a reactive filtration mechanism operable to receive the first effluent water stream and to remove a waste stream containing a second portion of the contaminant to produce a resultant second effluent stream.

BRIEF DESCRIPTION OF THE DRAWINGS

Features and advantages of the described implementations can be more readily understood by reference to the following description taken in conjunction with the accompanying drawings.

DETAILED DESCRIPTION

Overview

The present application relates to water treatment techniques and systems that employ both a reactive filtration mechanism and a membrane filtration mechanism for removing contaminants from a waste stream. The described systems and techniques are relatively economical to employ and maintain while offering relatively high operational robustness and system stability. For example, various implementations provide an economical process to remove phosphorus, arsenic, selenium, metal, and/or other contaminants from water or wastewater. At least some of these implementations can reduce contaminant concentrations in the resultant effluent water to very low levels (e.g., a few parts per billion) where desired. The described concepts can be implemented in new water processing systems or can be conveniently applied to existing water processing systems.

The described implementations include both a membrane filter and a reactive filter to remove contaminant(s) from water or a water stream. One case employs a membrane filter to separate a portion of the contaminant from a resulting effluent water stream. From the membrane filter, the effluent water stream can pass through a reactive filter. The reactive filter can function in a complimentary manner to the membrane filter to remove a second portion of the contaminant from the water and into a waste stream. For instance, in some scenarios, membrane filtration can remove a contaminant from the waste water so that about 20 parts per billion (ppb) of the contaminant remain in the resulting effluent. When reactive filtration is applied to the effluent produced by the membrane, contaminant concentrations can be further reduced to less than about 2-4 ppb with the remaining contaminants tending to be in particulate form. Further, often the 20 ppb of contaminant that remain after membrane filtration tend to be soluble forms. The reactive filtration is especially effective at removing these soluble contaminant forms to achieve very low contaminant concentrations.

In some cases, recycling some or all of the waste stream back into the water upstream from the membrane filter can subsequently enhance overall system performance relative to contaminant concentrations in the water stream leaving the reactive filter before the waste stream recycling begins.

Exemplary System

Figure 1:
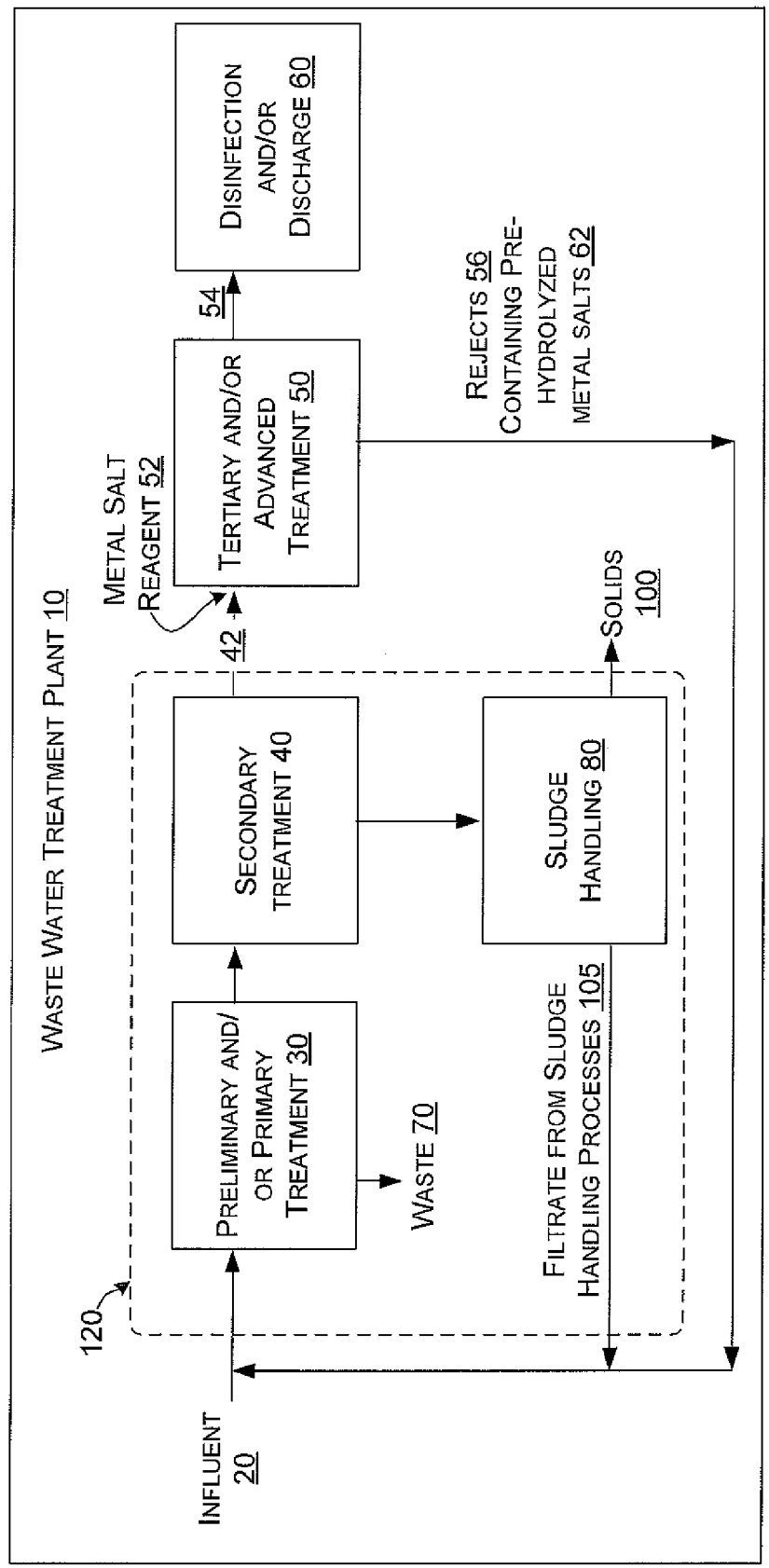
FIGS. 1-3 illustrate wastewater treatment systems or plants that may be utilized to implement various embodiments of the present application.
Figure 2:
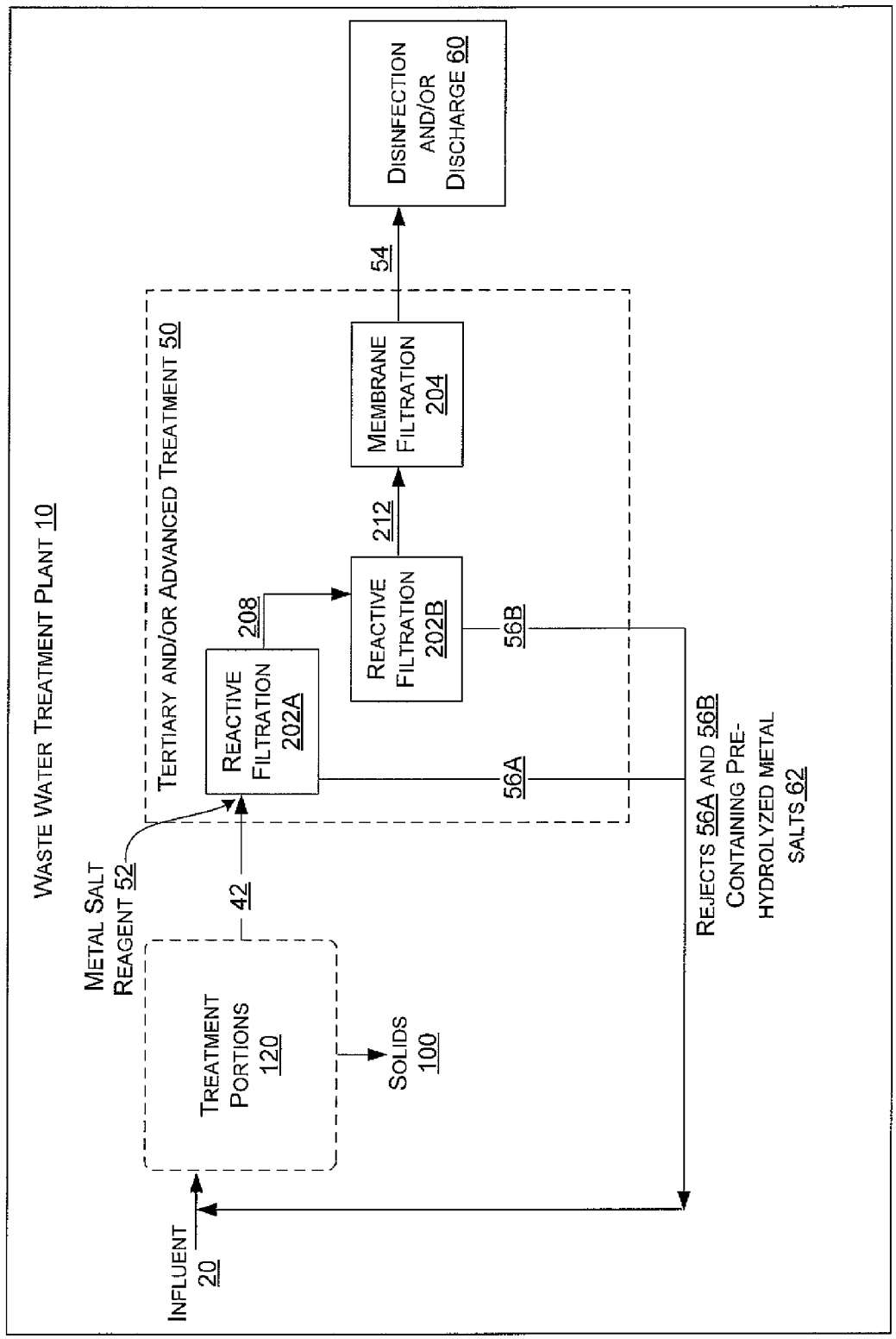
Figure 3:
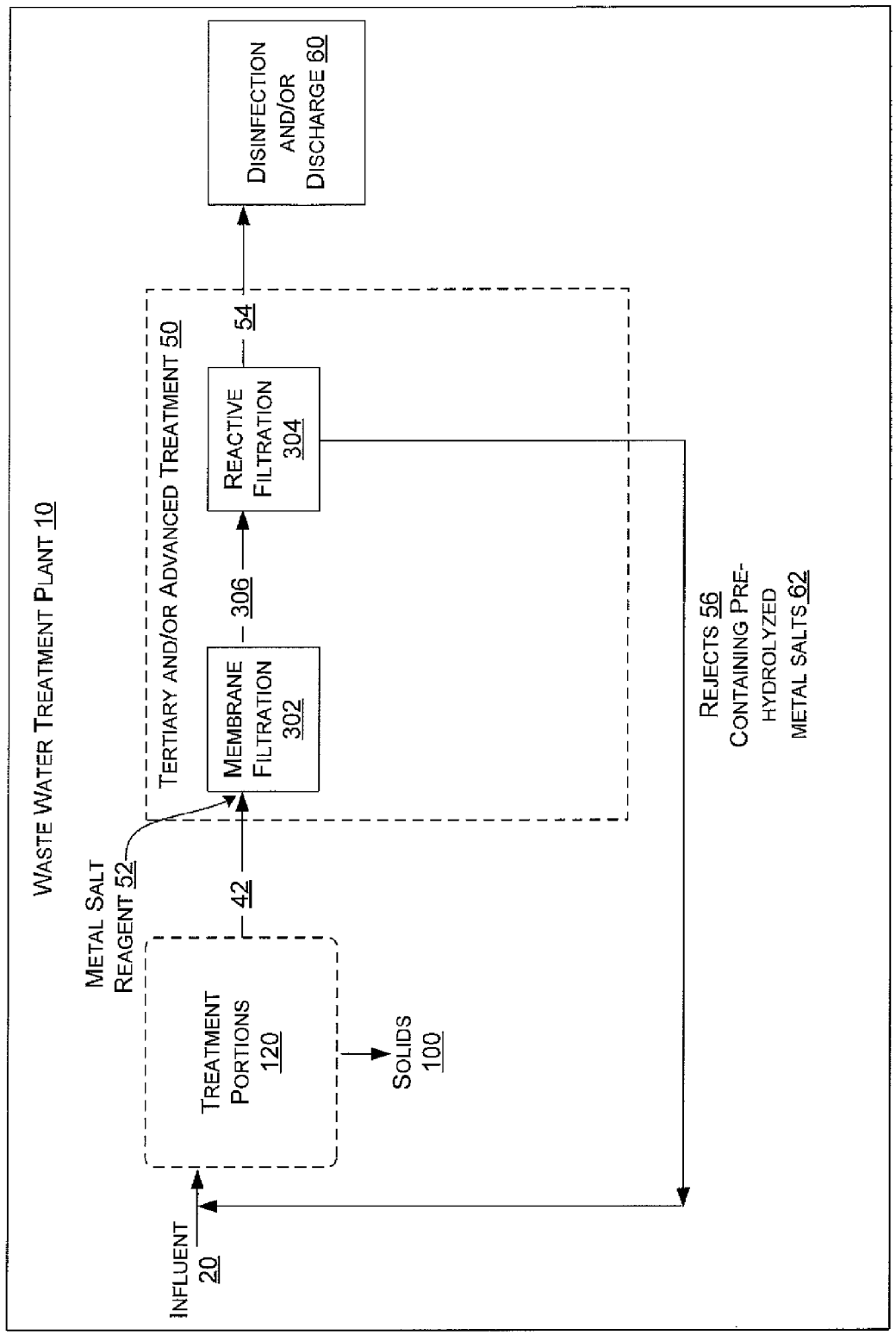

FIGS. 1-3 relate to a first exemplary plant or system for treating wastewater by employing both active filtration and membrane filtration. FIG. 1 offers a general illustration of various plant components. FIGS. 2-3 offer more detailed views of specific components introduced in FIG. 1 in accordance with two different embodiments.

Embodiments of the present application are effective at treating water or wastewater. "Water" or "wastewater" as used herein means any water to be treated. The water is not necessarily highly contaminated water and may contain only trace amounts of a contaminant or contaminants, such as phosphorus, arsenic and/or other contaminants (organic, inorganic, biological, or radiological).

FIG. 1 shows a wastewater treatment plant 10 where influent water 20 is treated with preliminary and/or primary treatment processes 30. The water then passes to a secondary treatment process 40 which produces effluent water 42. In the wastewater industry, "secondary treatment" typically refers to the biological portion of a wastewater-treatment process whether or not there is primary treatment; a "secondary clarifier" may therefore be the first clarifier in the process train. The effluent water 42 subsequently reaches tertiary and/or advanced treatment 50 for further processing. In some of the described configurations, and as will be described in more detail below, a metal salt(s) reagent 52, such as ferric chloride, is added during tertiary or advanced treatment 50 as part of a reactive filtration process.

Advanced treatment 50 serves to separate an effluent water 54 from a rejected waste or rejects 56. The effluent water 54 passes on to disinfection and/or discharge 60. In some implementations, rejects 56 are recycled to an earlier point in the plant's treatment. In this instance the rejects 56 are recycled to the front of the treatment plant, i.e. combined with the influent water 20. In other instances, the rejects can be recycled to an intermediate point in the plant upstream of advanced treatment 50. Rejects 56 can contain metal salt residuals 62. The metal salt residuals 62 and the recycling process will be described in more detail below.

Plant 10 may remove waste material 70 from the preliminary and/or primary treatment processes 30. The plant may also have sludge-handling facilities 80 for treatment of sludge from the secondary treatment processes 40. The sludge-handling facilities 80 may also treat sludge from the preliminary and/or primary treatments 30 and from the tertiary and/or advanced treatments 50. Solids 100 from the sludge-handling facilities 80 may be separated from a filtrate 105. The filtrate 105 may be directed back to the front of the plant 10. The filtrate 105 may or may not be combined with rejects 56 containing metal salt residuals 62 before being recycled to the front of the plant 10.

In some embodiments, the preliminary and/or primary treatment processes 30 include any headworks or single or combined preliminary or primary treatment processes such as screening, bar racks, comminutors, grit removal, sedimentation tanks, flotation, and primary clarification, or no preliminary or primary treatment. "Preliminary and/or primary treatment" as used herein includes any of those same single or combined processes.

In other embodiments, the secondary treatment process 40 may be manifest as any form of secondary treatment including aerobic or anaerobic suspended-growth variations, aerobic or anaerobic attached-growth variations, biological nutrient-removal variations, lagoon systems, septic systems, physical-chemical systems, chemical oxidation, advanced oxidation, membrane filtration, or membrane bioreactors. In some applications, such as treatment of industrial waste streams, there may be no secondary or biological treatment. "Secondary treatment" as used herein includes any of those same single or combined processes. For the sake of brevity only a single configuration for the primary treatment process 30 and the secondary treatment process 40 is illustrated. However, the skilled artisan should recognize from the discussion presented herein that generally designated treatment portions 120 relating to preliminary and/or primary treatment and/or secondary treatment 30 and 40 respectively of plant 10 are readily altered and/or eliminated consistent with various embodiments of the present concepts. For instance, some implementations may totally eliminate treatment portions 120 and directly deliver influent water 20 to tertiary and/or advanced treatment process 50.

As mentioned above, metal salt reagents 52 are introduced as part of the tertiary and/or advanced treatment process 50 as will be described in more detail below in relation to FIGS. 4-5. In other embodiments, another source of metal is added to the process or held within the process. For instance, a metal containing media may be employed in plant 10, such as in reactive filtration treatment which is described in more detail below. The added media can contain metal in one or more of the following forms: zero-valent metals, goethite, magnetite, iron oxides, amorphous iron oxides, granular ferric hydroxide, granular ferric oxide, iron oxide-coated materials such as sand, or electrically-generated iron or other metal solutions. In other embodiments, the iron or other metal content of the influent water 20 is used as a metal salt reagent.

Rejects 56 from the tertiary and/or advanced treatment process 50 contain metal salt residuals 62 that can be in the form of pre-hydrolyzed metal salts. As used herein "pre-hydrolyzed metal salts" means any metal salt residual or reject material which has been generated by a tertiary and/or advanced water-treatment method or created by mixing a metal salt reagent or other metal source with a water source other than the influent water. Recycling some or all of rejects 56 containing the metal salt residuals 62 to an earlier point in plant 10, such as into influent water 20 can lead to a subsequent rise in the plant's contaminant removal efficiency. For instance, the concentration of contaminant in effluent water 54 (and or effluent water 42) can decrease after the metal salt residual recycling process commences. In some instances, a lag time between the metal salt residual recycling and the minimum contaminant concentrations in effluent 54 may be experienced. The lag time appears to be related to solids retention. In some instances the lag time can be quite short (i.e., less than a day) while in other instances a lag time of several days to several weeks can be expected after the recycling of the metal salt residuals 62 begins before minimum contaminant concentrations are realized in effluent water 54.

FIG. 2 shows an implementation of the tertiary and/or advanced treatment process 50 of plant 10 in more detail. In this configuration, tertiary and/or advanced treatment 50 includes a combination of reactive filtration and membrane filtration.

In the illustrated configuration of FIG. 2, reactive filtration is accomplished via two reactive filtration mechanisms 202A, 202B and a membrane filtration mechanism 204. While this embodiment utilizes two reactive filtration mechanisms 202A, 202B employed in series, other embodiments can utilize a single reactive filtration mechanism or more than two reactive filtration mechanisms. Alternatively or additionally to the illustrated series configuration, reactive filtration mechanisms can be employed in a parallel manner and/or may be adjusted between parallel and series depending on plant water volume and contaminant removal efficiency requirements, among other factors.

Membrane filtration can be utilized to lower the amount of particulate and colloidal matter in water or wastewater by excluding the particulates while allowing clean water to pass through the membrane. Membrane filtration includes microfiltration (MF), ultrafiltration (UF), nanofiltration (NF), reverse osmosis (RO), dialysis, and electrodialysis (ED). Membrane processes may be classified in a number of ways, including the membrane material, the driving force for the separation, the actual separation mechanism, and the size of particulates excluded, among others. Here "membrane" will refer to any or all of these forms. Filtration by cloth and fiber filters may also remove a significant portion of particulates and is also included here where the term "membrane" is used. In wastewater treatment a membrane system may be combined with biological treatment, such as in a membrane bioreactor (MBR) activated sludge process, Accordingly, as used herein membrane filtration also includes MBRs.

In the present configuration, influent water 20 is supplied to treatment portions 120 to produce effluent water 42. The effluent water 42 is supplied to reactive filtration mechanism 202A. In some cases, only part of the effluent water 42 is sent to tertiary and/or advanced treatment 50. For example, in some situations the whole secondary effluent flow may not require further treatment for the plant 10 to achieve the overall required effluent contaminant concentrations. In such a scenario, the other portion of the effluent 42 from treatment portions 120 bypasses tertiary and/or advanced treatment 50 and goes directly to disinfection and/or discharge 60. Effluent 54 from the tertiary and/or advanced treatment 50 may pass directly to disinfection and/or discharge 60 or be combined with effluent 42 from treatment portions 120.

Reactive filtration mechanism 202A functions to separate contaminants from effluent water 42 utilizing metal salt reagents 52 to produce water 208. The separated contaminants are removed as a component of rejects 56A. The water 208 is sent to reactive filtration mechanism 202B. Reactive filtration mechanism 202B serves to remove additional contaminants as rejects 56B to produce water 212. Water 212 is directed to membrane filtration mechanism 204 which provides additional contaminant removal to produce water 54.

In this configuration, the reactive filtration mechanisms 202A, 202B provide increased contaminant removal relative to previous advanced processing techniques. Therefore, water 212 can have lower contaminant concentrations and/or solids levels than has traditionally been possible when received by a membrane filtration mechanism. Membrane filtration is highly regarded for theoretically removing contaminants to low concentrations. However, in the field, membrane filtration operation and maintenance costs increase greatly when the water to be filtered has high solids concentrations. Accordingly, membrane filtration has traditionally been applied as the final process in the plant to reduce contaminant concentrations in water received at the membrane filtration mechanism. However, in traditional scenarios, the practices have not been overly successful and the relatively high contaminant and/or solids levels remaining in the water supplied to the membrane filtration mechanism can effectively render the membrane filtration process cost prohibitive in actual field scenarios. Consider for instance, that chemical coagulation has been tried in combination with membrane filtration with relatively unimpressive results in relation to membrane replacement costs. It appears that chemical coagulation requires large chemical doses to be relatively effective on low levels of soluble contaminants, and still may not reach the extremely low levels possible with reactive filtration. Additionally, chemical addition in front of the membranes decreases useful membrane life, thereby increasing operations and maintenance costs. On the other hand reactive filtration is so effective in reducing contaminant and/or solids concentrations that the subsequent membrane filter can operate for relatively longer periods with relatively less maintenance than is traditionally encountered.

For example, in secondary clarifier effluent wastewater with a total phosphorus concentration of 0.780 mg/L P reactive filtration has been shown to lower total phosphorus to 0.061 mg/L P. In the same test, the ortho-phosphate component was lowered from 0.529 mg/L P to non-detect, or <0.010 mg/L P. This suggests that the remaining phosphorus is largely composed of the particulate form in at least this instance. Extremely low total phosphorus concentration may therefore be achieved by removing the particulate fraction by membrane filtration.

In summary, the reactive filtration process removes a high percentage of the suspended solids to produce relatively clean water to be sent to the membrane filtration mechanism. The relatively clean water effectively extends the operation life of the membrane. Accordingly, employing reactive filtration prior to the membrane filtration produces superior total plant contaminant removal efficiency relative to traditional techniques.

FIG. 3 shows still another embodiment for the tertiary and/or advanced treatment process 50 of plant 10. In this case, advanced treatment 50 includes a membrane filtration mechanism 302 and a reactive filtration mechanism 304. Influent water 20 is supplied to treatment portions 120 to produce effluent water 42. The effluent water 42 is supplied to membrane filtration mechanism 302. Metal salt reagents 52 may also be added to the membrane filtration mechanism 302. This metal salt reagent addition may be through chemical dosing or may result from the recycling of rejects (56). The membrane filtration mechanism removes contaminants to produce water 306 which is supplied to reactive filtration mechanism 304 for further contaminant removal.

Reactive filtration mechanism 304 removes rejects 56 to produce water 54. Rejects 56 can contain metal salt residuals 62. Some or all of the rejects can be recycled to a point upstream of the membrane filtration mechanism 302. In the illustrated configuration, the rejects are recycled back into the influent water 20. While such a recycling process appears that it would increase contaminant and/or solids levels experienced at the membrane filtration mechanism 302 and thereby ultimately increase contaminant concentrations of water 54 (or water 42) and/or otherwise worsen the overall plant water treatment rate, such is not the case. In fact, this recycling of rejects 56 and their associated metal salt residuals 62 can ultimately enhance overall plant contaminant removal efficiency and/or water processing rate, and decrease the contaminant concentrations of water 54 (or water 42). One explanation for the increased efficiency is that a greater concentration of solids and/or contaminants included in the influent water 20 are actually captured as solids 100 by treatment portions 120 when the metal salt residual recycling process is implemented.

In at least some cases, employing both membrane filtration and reactive filtration appears to work in a complimentary manner to effectively reduce contaminant levels. For instance, the recycled metal salt residuals 62 appear to decrease the solids load experienced by membrane filtration mechanism 302. This decreased solids load enhances the membrane filtration mechanism functionality. The membrane filtration mechanism 302 can then efficiently remove a relatively high percentage of the contaminant from the water to be filtered. The membrane filtration mechanism 302 can offer especially effective contaminant removal where the contaminant occurs in particulate or colloidal forms or compounds within the water stream 42. The reactive filtration mechanism 304 can function in a complimentary manner to the membrane filtration mechanism 302 in that the reactive filtration mechanism can be especially effective at removing forms of the contaminant that tend to remain after the membrane filtration mechanism 302. For example, the reactive filtration mechanism 304 can be especially effective at removing soluble forms of the contaminant such as where the contaminant is in a form that tends to remain in solution within the water stream. The reactive filtration mechanism 304 removes these contaminants into the waste stream of rejects 56 along with the metal salt residuals 62. The rejects, contaminants, and metal salt residuals are recycled upstream of a treatment process which has a solids removal mechanism by which the contaminants are removed into solids 100, thereby decreasing the contaminant load experienced by the membrane filtration mechanism 302.

One example of the above mentioned recycling process utilizes an iron containing metal salt reagent 52 which is subsequently recycled as an iron containing metal salt residual 62. The iron containing metal salt reagent is added at a concentration sufficient that after passing through the reactive filtration treatment process 304 various derivative metal salt residuals 62 can be identified in the rejects 56. For example, the metal salt residuals 62 can include hydrous ferric oxide and/or other iron-containing particulates which may have additional, unused adsorptive capacity. These particulates may be recycled upstream of the membrane filtration mechanism 302 to adsorb phosphorus, arsenic, or other contaminants from water to be treated such as influent water 20. The membrane filtration mechanism 302 will then exclude the particulate material, retaining both contaminant that was removed during the reactive filtration process and also additional contaminant adsorbed in front of the membrane. This improves the water or wastewater treatment results and also negates the need for a separate waste handling system for the reactive filtration treatment 304. The reject 56 waste stream from reactive filtration mechanism 304 can also be recycled or otherwise introduced to another beneficial point in the treatment plant 10, either before or after the reactive filtration mechanism, such as before any treatment step which includes solids separation, such as a clarifier, filter, or membrane.

Further the illustrated configuration of FIG. 3 lends itself to scenarios where a plant already includes membrane filtration or membrane bioreactor (MBR) treatment. The reactive filtration process tends to run more efficiently with lower suspended solids and/or particulates in its influent, such as may be encountered in effluent from a membrane. After the membrane removes the particulate material, the reactive filtration process could be added with relatively minor plant alterations to receive water from the membrane filtration and to remove the soluble contaminant fraction. Stated another way, the reactive filtration process can receive the membrane's effluent water containing mostly soluble contaminants and convert the contaminants to non-soluble forms that are then removed in reactive filtration waste stream. This configuration would allow more stable operation of the membrane system, with less chemical needed in front of the membrane system, and also more stable operation of the reactive filtration process, which would be fed water with a lower suspended solids concentration.

In some embodiments, disinfection processes may be applied before, during, or after the tertiary and/or advanced treatment processes 50. These disinfection processes may include chlorination, ultraviolet (UV) treatment, ozone treatment, or other disinfection or advanced-oxidation processes. There also may be no disinfection process. One such example utilizing ozone treatment will be described below in relation to FIGS. 4-5. Additional oxidative capacity of the residual waste stream that is recycled from a tertiary and/or advanced treatment process back to the initial stages of wastewater treatment may assist in the physical, chemical, and/or microbial processes used in wastewater treatment.

In other embodiments, lowering of nitrogen concentrations may be accomplished in the water-treatment plant 10 concurrent with the processes of the present application. For example, denitrification may be accomplished in the tertiary and/or advanced treatment concurrent with the production of metal salt residuals for recycle, such as can occur during phosphorus removal.

Exemplary Reactive Filtration

Figure 4:
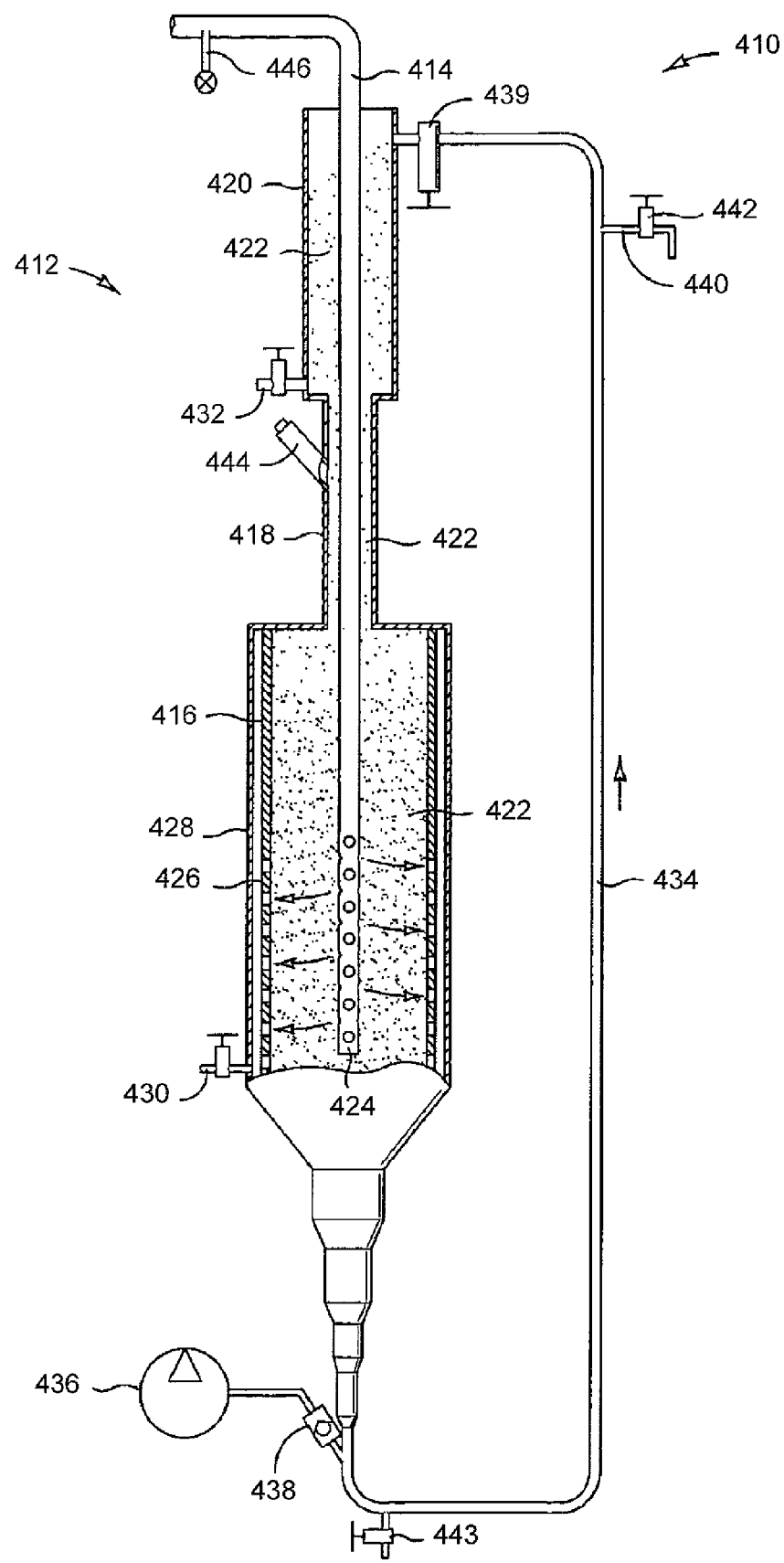
FIGS. 4-5 illustrate specific components of the wastewater treatment systems introduced in relation to FIGS. 1-3 in accordance with one embodiment.
Figure 5:
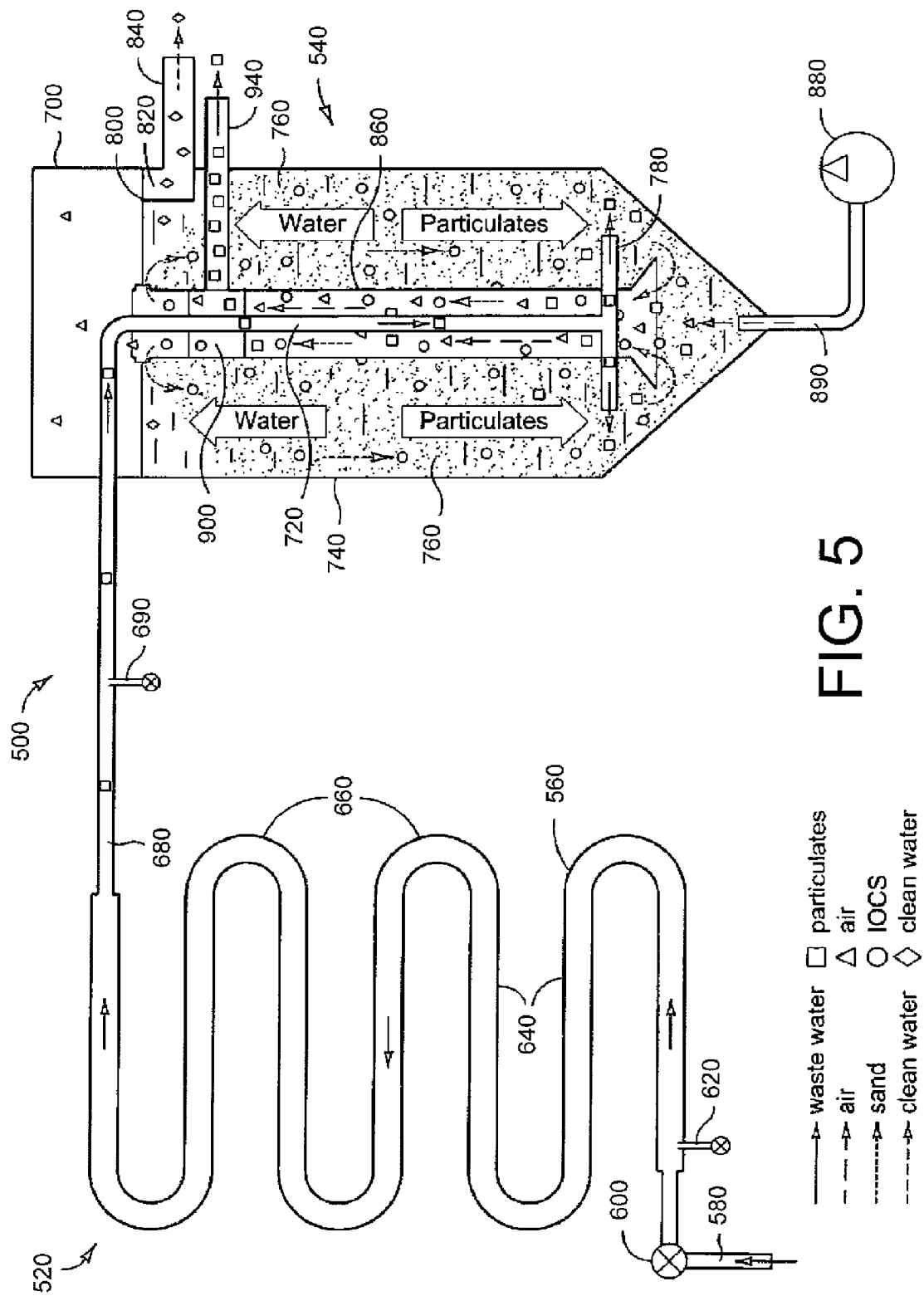

FIGS. 4-5 illustrate examples of reactive filtration treatment processes that can be employed in exemplary systems such as those described in relation to FIGS. 1-3.

FIG. 4 illustrates a moving-bed particle radial reactive filtration system 410 that may be used to implement embodiments of the inventive concepts, such as the reactive filtration concepts described above in relation to FIGS. 1-3. Referring to FIG. 4, wastewater flows into a vertically oriented cylindrical treatment vessel 412 through an inlet pipe 414. Vessel 412 includes a filter chamber 416, a stem 418 and an expansion gravity settling chamber 420. Filter chamber 416 contains a bed of sand 422, iron oxide coated sand, sand coated with various iron containing compounds such as sand and iron granules or another suitable filter media. Inlet pipe 414 extends down into filter chamber 416. Wastewater is discharged into sand 422 along the perforated lower part 424 of inlet pipe 414. Treated water flows out of filter chamber 416 through a perforated outer perimeter 426 into a sleeve 428 and is removed from vessel 412 through an outlet pipe 430. The perforations in the lower part 424 of inlet pipe 414 and the outer perimeter 426 of filter chamber 416 are screened as necessary to prevent sand from passing through the perforations.

The comparatively narrow stem 418 of vessel 412 connects filter chamber 416 with expansion chamber 420. A sludge removal port 432 is positioned near the bottom of expansion chamber 420. A recirculation pipe 434 extends from the bottom of filter chamber 416 to the top of expansion chamber 420. An air compressor 436 pumps air into recirculation pipe 434 at the bottom of filter chamber 416 causing a counter-clockwise motion of air, water, sand and filtered particulates through vessel 412. A back flow preventer 438, such as a flapper valve, prevents materials in recirculation pipe 434 from flowing back into compressor 436. A flow control valve 439, sampling tube 440, sampling valve 442 and clean-out 443 on recirculation pipe 434, and a sight glass 444 in stem 418, may be provided if necessary or desirable.

In operation, wastewater pumped into filter chamber 416 through inlet pipe 414 passes radially through sand 422 into sleeve 428 and flows out outlet pipe 430 as treated water. Sand 422 moves generally continuously down through vessel 412 under the influence of gravity. An aerated mixture of used sand and water flows from the bottom of filter chamber 416 back up to expansion chamber 420 through recirculation pipe 434 along with contaminants removed from the wastewater. Air is vented to the atmosphere at the top of expansion chamber 420 to prevent pressurization of the system. The pressure head of water in sand 422 is kept such that some of the treated water flows from filter chamber 416 up through stem 418 into expansion chamber 420 to rinse contaminants from the used sand particles returning to expansion chamber 420. This rinse water, now carrying a high concentration of contaminants that tend to be less dense than sand, is removed from chamber 422 and flows out through sludge removal port 432. In one operation, the top of the sand bed for filtration is three fourths the height of filter chamber 416. Expansion chamber 420 and narrow stem 418 contain a dilute sand and water mixture that contains filtered particles that have been moved first to the bottom of sand 422 and circulated via pipe 434 into the water residing in expansion chamber 420. In one case, water flow at inlet pipe 414, outlets 430 and 432 and recirculation pipe 434 can be balanced so that a rate of 5-10% of the inlet water carrying contaminants is discharged through sludge removal port 432.

In some embodiments, the system of FIG. 4 may be used to implement a process for continuously regenerating an iron oxide coated sand bed, and/or other iron containing compounds coated sand bed, while simultaneously filtering contaminants from the incoming flow of wastewater. The process creates and utilizes a reactive filter media that removes contaminants, such as by filtering and/or by adsorption. A reactive filter media is any filter media with the additional capability of removing contaminants from wastewater through chemical processes such as adsorption. For instance, the iron oxide coated sand bed, a reactive filter media, screens contaminants from the water and the reactive surfaces of the granules of sand adsorb contaminants from the water. In one embodiment, iron metal granules in proportions of 10-30% by volume in sand bed 422 provide a solid phase reactive surface of corroding iron metal as well as a source of dissolved iron such as salts of $Fe(II)$ and $Fe(III)$ that react with the sand in the filter bed to create reactive iron oxide coated sand and/or other iron containing compounds that interact with the contaminants. The strongly reducing nature of water solutions with iron metal and sand mixtures can be useful for chemical reactions, such as the reductive degradation of organic solvents dissolved in contaminated water. Reduction potentials lower than −200 mV versus the standard hydrogen electrode can be observed with 30% iron:sand mixtures.

In some embodiments, a reagent capable of creating a reactive surface on the filter media is added to the incoming flow of wastewater at molar ratios such as 5:1 to 200:1 with the target contaminant. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is an exemplary reagent when phosphorus or arsenic is the target contaminant. In any particular water targeted for treatment, there may be alternate and competitive reactive pathways for the added active reagents. These pathways will be the result of the specific water chemistry in the wastewater. For example, wastewater with high levels of dissolved carbonate or phosphate can react with added iron salts in competition to the target contaminant such as arsenic. Molar ratios of Fe(III) to water arsenic in field studies have been in excess of 100:1. In these studies, inlet concentrations of arsenic in source water for drinking were reduced from approximately 40 parts per billion to less than 5 parts per billion treating at a rate of 10 gallon per minute in a pilot scale operation. However, other water types may have less alternate, competitive reactive pathways. Some implementations may field test to determine the optimal molar ratio for any particular treatment environment to ensure sufficient excess reagent is delivered to the reactive sand surface to form iron oxide coated sand. Still other implementations may dose the metal salt reagent based upon an amount sufficient to coat the sand with metal salt reagents and/or derivative thereof, or may dose to match a total suspended solids to total dissolved solids ratio (TSS/TDS). Calculating near optimal reagent dosing rates can further decrease reagent costs and process costs resulting from having large amounts of excess reagent in the resulting effluent.

In the removal of dissolved and suspended phosphorus, field studies have demonstrated that successful high flow, low concentration removal occurs in this process in iron to phosphorus molar ratios of 5:1 to 40:1. It can be advantageous that the actual reagent dose is optimized to ensure near complete solution reaction and saturation of all of the competing reactive pathways and allowing for residual iron in the solution to react with the sand bed. In some phosphorus contaminated test wastewaters, optimizing the correct balance of conditions yields a ratio of iron to phosphorus at 8:1. The metal salt reagent, ferric chloride in this example, reacts with the surface of the sand to form iron oxide coated sand (IOCS) and/or hydrous ferric coated sand, among other compounds. IOCS provides a stationary phase removal pathway for water borne contaminants such as phosphorus and arsenic. Contaminants in the wastewater are exposed as a "mobile" phase over the "stationary" (slowly moving) IOCS bed for high efficiency sorptive and ion exchange removal. The physical action of the moving sand abrades the surface of the sand granules, regenerating active sites for additional iron salt and water contaminant reactions. Hence, regenerated reactive sites for contaminant binding are continually presented to the flowing water. Abraded sand-iron-contaminant solids are removed by the screen filtering action of the sand bed. The treated water exits the sand filter bed with contaminants substantially removed, ready for discharge, recycling, or post-treatment processing.

Sorption is the removal of undersaturated solutes from solution onto minerals. Sorbate is the species removed from solution and the sorbent is the solid onto which solution species are sorbed. There are three types of sorption: adsorption wherein solutes are held at the mineral surface as a hydrated species; absorption wherein solute is incorporated into the mineral structure at the surface; and ion exchange wherein an ion becomes sorbed to a surface by changing places with a similarly charged ion previously residing on the sorbent. Mineral surfaces, such as the silicates in sand, have fixed or acquired surface charges that can be modified by water chemistry such as pH and dissolved solutes such as iron salts that can complex with the surface charges of sand. As a result of fixed surface charges, a property of the mineral, and pH, a property of the water, mineral surfaces develop a point of zero net proton charge (PZNPC). The PZNPC is the pH at which net surface charge is zero. At lower pH than PZNPC, the net surface charge is positive and at higher pH, the net surface charge is negative. These surface charges allow attraction of oppositely charged anions or cations, respectively, from solution. Larger amounts of dissolved constituents, such as positively charged Fe(III) can be attracted to a negatively charged surface such as the silicates in sand to such a degree that the surface becomes overall positively charged and therefore attractive to anions such as phosphate and arsenate. Silica, $SiO_2$ has a low PZNPC of 2, whereas iron oxyhydroxide, .alpha.-FeOOH has a PZNPC of 7.8, and iron hydroxide, $Fe(OH)_3$ has a PZNPC of 8.5. Increasing quantities of iron oxide forming on a sand surface can increase the PZNCP of the sand grains such that net surface charge is positive and thereby attractive to anions such as phosphate and arsenate at higher pH levels of about 6-8. Most environmental waters, including drinking water and wastewaters exist at these circum-neutral pH levels. Hence, the selective addition of iron oxides to the sand creates a useful sorbent.

In a moving sand bed system such as the one shown in FIG. 4, concentrated contaminants, now in the form of filterable solid waste, are removed from the system through sludge removal port 432 via continuous rinsing in expansion chamber 418. This continuous rinsing and waste removal process is particularly important in the case of a hazardous material such as arsenic in drinking water. As mentioned above in relation to FIGS. 1-3, rinse/wastewater outflow (i.e., rejects 56 of FIGS. 1-3), typically 5-10% of the incoming water, can be recycled and put back into the process following separation of the suspended solids by settling or clarification. In a fixed-bed system, in which the particulate filtrate remains on the sand and in the sand, the sand bed is periodically flushed or changed out to remove the concentrated contaminant waste.

In some scenarios, the system of FIG. 4 may be used to implement embodiments of an oxidation process for treating wastewater. Ozone gas ($O_3$) is mixed with the wastewater before the water passes through sand 422 at an ozone inlet port 446. Since ozone solubility in water is limited, mineral surfaces on the sand 422 adsorb ozone from the passing ozonized wastewater. As used in this document, "ozonized" water means any mixture or other combination of water and ozone. The adsorption of ozone on the surface of sand 422 enhances reaction with oxidizible substances in the water. Since any oxidant will have preferred chemical reactivity, such as ozone attacking double bonded carbon, it is desirable to enhance the destructive pathways available to oxidizible contaminants by introducing or creating multiple oxidation pathways. The silica in typical sand acts as a reversible ozone sorption site and activated surface. Mineral oxides in the sand or adsorbed to the sand, such as iron oxide or manganese oxide, act as catalysts to convert ozone to reactive hydroperoxides. As water passes through sand 422, the surface reaction with sorbed ozone, hydroperoxides and other oxidative byproducts and hydroperoxides enhances the reactive solution chemistry of the dissolved ozone. This allows for surface reactions for oxidation of dissolved chemical compounds, enhanced disinfection via oxidative attack on microbial cell walls and cell constituents and the conservation of total oxidant loading via solid surface storage.

Embodiments of the process create and utilize a renewable, catalytic, oxidizing filter media that removes contaminants by filtering and by oxidation. Maximum oxidation of contaminants is combined with the particulate removal filtration properties of the moving sand 422. Ozone levels in the waste (port 432), treated water (port 430) and recirculation water (pipe 434) may be monitored to help optimize the amount of ozone introduced into the incoming wastewater. Ozone is mixed with the wastewater using any suitable gas-liquid mixing techniques, for example, contactors, diffusers or venturi effect mixers with headspace vented or vacuum pumped to prevent undesirable gas bubbles from entering the sand filter bed.

Deploying the sand or other suitable filter media in a moving bed assists in continuously renewing the ozone sorption sites as well as catalytic and activated surfaces. Movement may be accomplished, for example, by fluidizing or moving the bed using the fluid flow, by mechanical action such as augers or mixing bars, by acoustic action such as the application of ultrasonic waves or by physical transport using compressed air.

The application to the ozone containing water of ultrasonic energy for acoustic cavitation or pressure jets or diffusers for hydrodynamic cavitation may be desirable in some applications to form high energy, reactive oxidants including superoxide, hydroxyl radicals and peroxide. A reagent capable of creating a reactive surface on the filter media may be added to the incoming flow of wastewater as necessary or desirable to assist in the removal of reactive contaminants such as dissolved organic matter and phosphorus. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is a suitable reagent when phosphorus or arsenic is the target contaminant. Suspended iron-oxy-hydroxide particulates in the wastewater following the addition of ferric chloride also become catalytic surfaces for hydroperoxide formation from ozone. It is expected that the addition of ferric chloride or other fully oxidized metal salts will have minimal effect on the direct consumption of or competition for ozone.

FIG. 5 illustrates a moving bed reactive filtration system 500 that provides another example of a reactive filtration mechanism consistent with the description of FIGS. 1-3. Referring to FIG. 5, filtration system 500 includes both a pre-reactor system 520 and a reactive filter system 540. Wastewater is pumped into the serpentine piping 560 of pre-reactor 520 through an inlet pipe 580 and flow control valve 600. A metal salt reagent or other suitable reagent (examples described above and below) is introduced into serpentine piping 560 through a reagent inlet port 620 immediately downstream from inlet pipe 580. In some instances, serpentine piping 560 is substantially larger than inlet pipe 580 to slow the flow through piping 560 compared to inlet pipe 580. A slower flow increases the time available for the reagent to mix with the wastewater and react with contaminants in the wastewater. The wastewater flow will be more turbulent near the transition from the smaller inlet pipe 580 to the larger serpentine piping 560. Introducing the reagent into this turbulent flow also helps mixing.

The wastewater/reagent mix flows through straight-aways 640 and gentle bends 660 of serpentine piping 560. The wastewater/reagent mix exits serpentine piping 560 into an outlet pipe 680 that takes the mix into reactive filter system 540. Prescribed dosing for the allotted reaction time introduces the metal salt reagent in sufficient quantities and concentrations to (1) allow for the co-precipitation and flocculation reactions between the metal salt reagent and the dissolved contaminants in pre-reactor system 520 to go to near completion to dilute levels as opposed to equilibrium and diffusion limited processes which limit further reaction, (2) saturate competing reactive pathways with natural waters with reagent, and (3) leave enough excess reagent in the mix to activate the filter media in reactive filter system 540. The amount of excess metal salt reagent is determined by the reactive capacity of the influent solution and the desire to deliver excess metal salt reagent to the sand filtration bed for the continuous formation of iron oxide coated sand that can be available for direct surface sorption or mineralization reactions with contaminants.

The comparatively slow flow through serpentine piping 560 allows for better coagulation of precipitates. The straight-aways 640 allow for less turbulent flow to enhance coagulation. Periodic gentle bends 660 introduce and maintain additional turbulent flow and introduce flow vortices to periodically mix the flowing solution. In one case, the serpentine mixing array allows for a decrease in flow velocity for 2-8 minutes allowing for sufficient pre-reaction time. Design of the array needs to consider maintaining sufficient flow to prevent deposition of precipitation solids in the pre-reactor assembly. The actual length and diameter of serpentine piping 560 for most applications will result for an optimization of the required reaction time (usually 1-5 minutes), the desired flow rate, the space available at the site of deployment, and the presence of competing reactions in the treatment water.

Metal salt reagents can be created from various metals, metal salts, metal compounds, or combinations thereof, including iron, aluminum, manganese, zinc, copper, magnesium, and calcium, among others. Starting materials for this metal salt reagent may be suitable pure materials commercially obtained as typical water-treatment reagents, waste or byproduct materials from another process, or natural materials obtained from mined or extracted minerals with or without intermediate processing. The resulting solution or residuals may or may not require pH adjustment. The metal salt reagent solution may be applied to the reactive filtration mechanism 540 in a continuous flow, semi-continuous flow, batch flow, or other addition method that may be advantageous. Mechanical mixing may be applied to the metal salt reagent solution to maintain solution consistency. The metal ions may be produced alternately by an electrolytic process with the application of electric current into metal electrodes or by the chemical reaction of a metal-containing material or waste product with a reactive reagent such as an acid or enzyme. The metal salt reagent solution may be created from the spontaneous reaction of a metal such as zero-valent iron with water. Iron, as salts or compounds, will typically be used as the metal salt reagent due to its proven reactivity with a variety of contaminants and its current widespread use in water treatment. The favorable interaction of oxidized iron with iron-reducing bacteria (IRB) is another potential advantage. Several contaminants of interest have significant direct iron-compound reactivity. Ferric chloride, for example, is an example of a reagent when phosphorus or arsenic is the target contaminant. It is recognized that certain contaminants such as arsenic will be less desirable for recycling back into a water-treatment process because of the potential toxicity resulting from a process upset that relates to the release of concentrated hazardous waste. As mentioned above in relation to FIGS. 1-3, rejects containing metal salt residuals may be created by the reactive filtration mechanism 540 and can be recycled to a point earlier in the wastewater treatment plant. In some embodiments, metal salt residuals may also be created in a separate process by mixing metal salt reagents with water other than the influent water, such as filtrate recycled from later in the water-treatment plant or a different water source. This metal salt reagent stream may benefit from pH adjustment, exposure to atmospheric oxygen, aging in a holding tank, and/or other chemical or physical treatments.

The availability of the metal for generating metal salt residuals or the stability of the residuals or their solution may be improved by chemically reacting the metal or solution, including precipitation, co-precipitation, changing the oxidation-reduction potential or the pH of the solution, adding a coagulant or coagulant aid, or using a combination of metal reagents or metal-containing media. The metal-reagent solution may be dilute or concentrated, and other metal-containing or non-metal-containing solids may be added to enhance the desired reaction.

Phosphorus exists in waters and wastewaters as dissolved ortho-phosphate, polyphosphate and complex organic-phosphorus compounds. In typical phosphorus containing wastewaters, such as the secondary or tertiary effluents of municipal wastewater treatment plants, there is a dissolved fraction, primarily as ortho-phosphate ($PO_4^{3-}$) and poly-phosphates and as a micro-particulate or suspended fraction of phosphorus containing solids. Trace levels of arsenic are sometimes found in some sources of drinking water and in higher concentrations in some wastewaters. Arsenic can occur in natural waters in the reduced arsenite, As(III) or oxidized arsenate, As(V) forms. Arsenate reacts with iron and aluminum salts to form insoluble compounds. Waters with arsenite contamination can be treated with an oxidizer such as chlorine to allow for further reaction with reactive metal salts. Ferric chloride or sulfate is typically used as a metal salt reagent to remove phosphorus and arsenic from water, although other salts and ferrous compounds can be used. These metal salts can react with other contaminants in solution either by physical means (coagulation, flocculation) or by direct or indirect chemical reaction.

For phosphorus, ferric chloride can be added at a molar ratio of 5:1 to 40:1 with the phosphorus in the wastewater. The pre-reactor system allows for a pre-reaction to form metal phosphate salts such as $FePO_4$, Vivianite and humic-fulvic organic phosphorus solids that are amenable to filtration in the sand bed reactive filter system. Vivianite is a very thermodynamically stable compound that is rapidly formed in solutions of iron cations and phosphate. Excess iron salt reagent is passed unreacted into the sand bed where it binds to the surface of the sand to form iron coated sand, a phosphate and polyphosphate reactive surface. Metal cations will selectively bind to the silicate and other negatively charged groups on the solid sand surface. This binding will yield a partially charged cationic boundary layer on the iron coated sand surface that will be reactive with soluble ortho-phosphate and poly-phosphate. The mobile phase (treatment water) and stationary phase (iron coated sand) configuration of this process allows for near quantitative removal of phosphorus because diffusion processes are nearly eliminated in the dilute solution reactive pathway of this process. Testing has shown that this process can remove ortho-phosphate to less than detection limits (10 part per billion) at efficiencies greater than 99% and total phosphorus to less than 40 parts per billion at greater than 90% efficiency of removal from the original concentration.

The processes described above have been shown to produce iron arsenic solids that are classified non-hazardous by the Toxicity Characteristic Leaching Procedure (TCLP) directed by the Resource Conservation and Recovery Act (RCRA 42 U.S.C. s/s 6901 et seq.) and can be disposed in a landfill, and iron phosphate solids that may be used in agricultural applications as a low grade slow release fertilizer.

In some implementations, ozone is mixed with the pre-treated wastewater at ozone inlet port 690 or alternately at the beginning of serpentine piping 560. This can be followed by venting or vacuum treatment of any headspace formed by excess gas from the ozonation process as large quantities of gas bubbles entering the sand filter may not be desirable. The pre-treated ozonated wastewater flows into a vertically oriented cylindrical treatment vessel 700 of reactive filtration system 540 through an inlet pipe 720. Inlet pipe 720 is positioned at the center of vessel 700. Vessel 700 includes a filter chamber 740 that contains a bed of sand 760 or another suitable filter media. Inlet pipe 720 extends down into filter chamber 740 to discharge the wastewater into the lower portion of sand bed 760 through a perforated manifold 780. Wastewater pumped into filter chamber 740 passes up through sand 760, over a baffle 800 near the top of filter chamber 740 as fully treated water, into a basin 820 and is removed from vessel 700 through an outlet pipe 840.

A recirculation tube 860 extends from the bottom to the top of filter chamber 740 at the center of vessel 700. Inlet pipe 720 extends down the center of recirculation tube 860. Inlet flow discharge manifold 780 extends out through openings in recirculation tube 860. An air compressor 880 pumps air into used sand and water at the bottom of vessel 700 through an air inlet pipe 890. The aerated mixture of used sand and water rises through recirculation tube 860 along with contaminants removed from the wastewater up to a sand and particulate/water separator 900. Separator 900 represents generally any suitable separation device that may use, for example, physical separation, gravity separation, particle size separation, magnetic separation, membrane separation, or cyclonic separation. The sand removed from the mix by separator 900 is recycled back to filter chamber 740. The now highly contaminated wastewater is removed through a sludge removal port 940. Sand 760 moves continuously down through vessel 700 under the influence of gravity.

The reactive filter media are deployed in a moving bed to assist in continuous renewal of the reactive iron oxide layer. Movement may be accomplished, for example, by fluidizing or moving the bed using the fluid flow, by mechanical action such as augers or mixing bars, by acoustic action such as the application of ultrasonic waves or by physical transport using compressed air.

Other reactive filtration embodiments can be utilized. For example, the filter media can be any natural or synthetic, organic or inorganic substrate that can react with dissolved iron to form a reactive oxide surface. The particle size of the filter media will be a size suitable for the level of filtration and flow desired. It is expected that the following inorganic materials will provide suitable filtration media; sand; silica beads or granules; high silicate glass; glass beads; glass sand; zeolite; mineral sands such as olivine, hematite, goethite; diatomaceous earth; iron oxyhydroxide granules; iron oxide granules; ceramic beads or granules; iron metal granules or beads; iron metal coated beads or granules; and synthetic or natural iron coated sand. It is expected that the following organic materials will provide suitable filtration media: polystyrene beads; polyethylene beads; modified cationic surface polymer beads; modified anionic surface polymer beads; mixed or pure polymer beads or granules; and polymer coated inorganic beads or granules. Some of these materials can have naturally occurring reactive sites that can be maintained or supplemented by the addition of active reagents such as ferric chloride solution. Because of the well known filtration properties of sand, its inexpensive use, its routine application in water treatment, its natural reactive silicate surface for inner sphere and outer sphere metal oxide binding to form iron oxide coated sand, and its abrasion properties, it is a preferred embodiment of an active filtration media in a moving bed process.

Suitable filtration media include corroding iron metal granules or ion exchange resins with the ability to bind iron compounds. Corroding iron metal granules allow for reductive processes that can be used to remove trace amounts of chlorinated solvents in water. Testing has shown that a 30% by volume iron-sand bed deployed in the system of FIG. 4 has a solution oxidation-reduction potential of −200 mV versus the standard hydrogen electrode. Typical deployments of static beds of iron granules or iron granules and sand suffer from loss of porosity or passivation of the reactive iron metal surface. The motion of a moving bed deployment allows for a continual refreshing of the iron metal surface and its associated chemically reactive sites as well as maintenance of filtration ability. A 98% efficiency has been demonstrated for removing phosphorus from contaminated discharge water originally containing 2 to 3 parts per million phosphorus.

In some circumstances, removing arsenic for example, it may be desirable to pre-oxidize the wastewater to convert arsenite to the iron reactive arsenate. Arsenite in natural solutions at circumneutral pH is non-ionic and therefore typically non-reactive in most treatment deployments. Pre-oxidation can be accomplished using conventional water oxidation operations such as chlorination, sonication or ozonation. The pre-oxidation operation can be part of a full water treatment process train and may be preceded or followed by other conventional water treatment processes such as filtration, aeration, chemical treatment, flocculation, clarification and others that may be required in the normal processing and disinfection of drinking water.

In the system described above, excess ferric iron enters sand bed 760 along with the particulate Fe—As or Fe—P solids and residual As or P in solution in the wastewater. Ferric ions react with sand surfaces to form iron oxide coated sand (IOCS). IOCS sorbs residual solution As/P out of solution. The physical action of the moving sand abrades the surface of the sand granules, refreshing active sites for additional IOCS formation and Fe—As or Fe—P reactions. Hence, fresh reactive sites for As/P binding are continually presented to the flowing water via microscopic erosion of the sand surface. In implementations that employ ozone, the ozone will oxidize any reduced As(III) to As(IV) making it more reactive with iron compounds. Ozone and the related solution oxidants will also destroy organic contaminants and lead to disinfection.

Chemical and microbial contamination enters water through natural and anthropogenic means and removing such contamination makes water suitable for a variety of uses including drinking water and return of wastewater to natural water bodies. Oxidation can convert contaminating chemical compounds to their mineralized forms such as the products of carbon dioxide and water from hydrocarbon chemicals. Applying simultaneous multiple oxidation modes such as ozonation, metal oxide catalytic ozonation, surface adsorbed ozonation and ultrasonic or hydrodynamic cavitation with ozone can increase the total number and chemical diversity of the oxidants available thus increasing the likelihood of complete mineralization, even for recalcitrant or refractory compounds. This has direct application reducing the concentration of highly toxic or highly bioactive substances in water via enhanced oxidation. Examples of highly bioactive substance in wastewater are pharmaceuticals and hormonally active compounds. Concomitantly, the enhanced oxidation has the desirable effect of enhancing the completeness of disinfection of water contaminated with infectious disease agents such as bacteria and viruses.

Exemplary Methods

Figure 6:
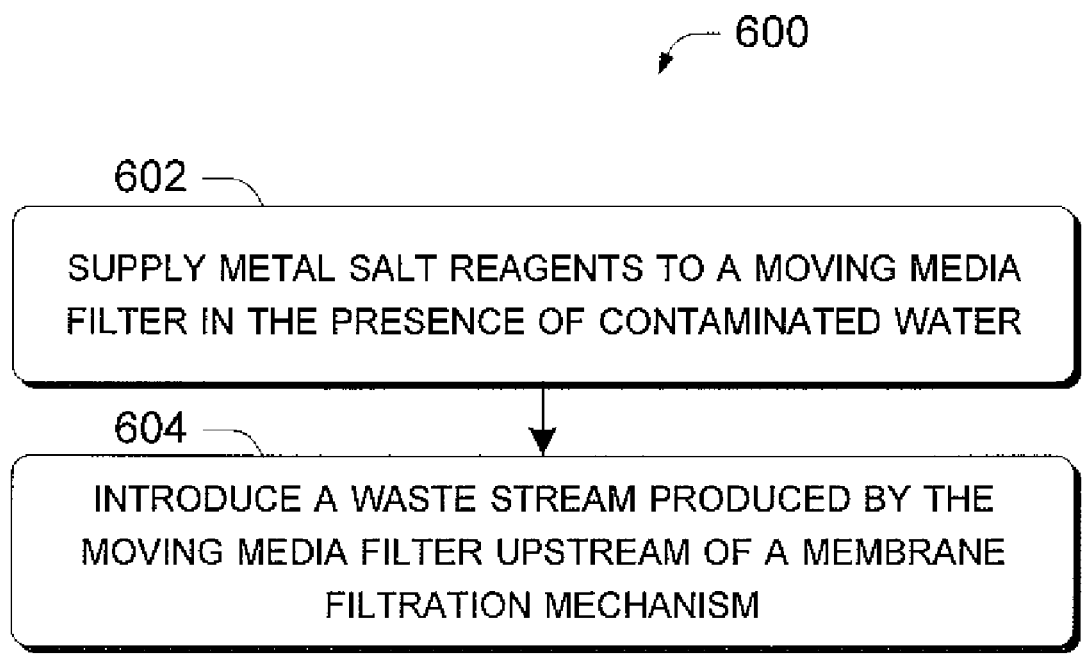
FIG. 6 is an exemplary method for contaminant removal from a water stream in accordance with one embodiment.

FIG. 6 shows an exemplary method or technique 600 for removing contaminants from a water stream.

At block 602, the technique supplies metal salt reagents to a moving media filter in the presence of contaminated water. Examples of metal salts include iron containing compounds such as ferric chloride. Other examples include various metals, metal salts, metal compounds, or combinations thereof, including iron, aluminum, manganese, zinc, copper, magnesium, and calcium, among others, with further examples described above.

Examples of moving media filters include upflow media filters, such as those illustrated in FIGS. 4-5. Other media filters could alternatively be employed. For instance, various moving bed or static bed, upflow or downflow, gravity or pressure filters, with either coagulation-filtration, ion exchange, or adsorption-based removal mechanisms for contaminant removal could be employed among others in various embodiments. The metal salt reagents can be introduced into the contaminated water before the water reaches the moving media filter or the metal salt reagents can be directly introduced at the moving media filter.

At block 604, the technique introduces a waste stream produced by the moving media filter upstream of a membrane filtration mechanism. In some cases the membrane filtration mechanism is upstream from the moving media filter such that introducing the waste stream upstream of the membrane filtration mechanism entails recycling the waste stream to an earlier point in the treatment process. In some instances, the waste stream includes metal salt residuals that can be useful to the overall treatment process to increase overall system contaminant removal efficiency and/or water treatment rate. In some scenarios, the metal salt residuals can be thought of as pre-hydrolyzed metal salts from a perspective of the upstream components that receive the hydrolyzed metal salts in that the metal salts are hydrolyzed prior to receipt by the upstream components. In essence, the metal salt residuals arrive at the upstream components in their active form rather than a precursor form such as a metal salt.

One example where the target contaminant is phosphorus and the metal salt reagent includes iron containing compounds such as ferric chloride is described in more detail below. In this case, it is observed that the iron-containing process residuals such as hydrolyzed iron salts, from tertiary reactive filtration at a wastewater treatment plant are stable with respect to sequestered phosphorus (P) when recycled back to the headwaters of the treatment plant, such as a point in the treatment plant upstream of primary, secondary, or biological treatment. Additionally, data suggest that the untreated iron residuals from the reactive filtration process actually improve normal total phosphorus (TP), total suspended solids (TSS), and biological oxygen demand (BOD) removal in the wastewater plant, by either biological, chemical, or mechanical mechanisms or a combination of mechanisms. Thus, these recycled residual materials stimulate and enhance chemically enhanced primary treatment (CEPT)

processes and other preliminary, primary, and secondary processes in typical municipal and other wastewater-treatment plants. Using the reactive-filtration process residuals as a reagent to enhance plant TP, TSS, and BOD removal efficiency is an advantage and improvement over existing approaches.

Operational evidence shows that primary and secondary treatment solids removal is enhanced by tertiary iron residuals addition; this effect is presumed to occur by iron compounds coagulating smaller particles in the 1-5% solids solution that makes up typical raw municipal wastewater. Additional direct reaction of reactive phosphorus as orthophosphate and polyphosphates with the iron solids and dissolved iron cations from recycled tertiary iron residual waste is also possible. The solids removal occurs during normal solids removal by oxidation and clarification in typical wastewater primary/secondary treatment operations. This solids and contaminant removal can occur via stimulation of bioflocculation and granulation, in addition to coagulation and flocculation. In typical wastewater process operation, return activated sludge (RAS) from secondary biological processes to primary processing ensures that the microbial and chemical changes in the treatment train stabilize with respect to microbial innocula and degraded chemical constituents. It is well known that RAS assists in stabilizing overall treatment operations by minimizing process upsets. Iron-modified RAS will preserve and stabilize these changes in total plant operation as well. One of the effects will be the increase in population and activity of iron-reducing bacteria (IRB) in response to ferric iron dosing of the system. IRB are efficient in the biological treatment or uptake of phosphorus, in anaerobic conditions, such as through the following process:

$$4Fe^{3+}+CH_2O+H_2O \rightarrow 4Fe^{2+}+CO_2+4H^+ \quad (1)$$

$$x_1Fe^{2+}+x_2H_2O \rightarrow x_3Fe(OH)^+\downarrow+x_4Fe(OH)_2\downarrow+x_5Fe(OH)_3^-\downarrow+x_6H^+ \quad (2)$$

$$(4-x_1)Fe^{2+}+(4-x_1)HPO_4^{2-} \rightarrow (4-x_1)FeHPO_4\downarrow \quad (3)$$

$$x_3Fe(OH)^+\downarrow+x_3H_2PO_4^- \rightarrow x_3FeHPO_4\downarrow+x_3H_2O \quad (4)$$

where $CH_2O$ denotes a carbon-containing substrate.

In some configurations, the reactive-filtration process, which may work more efficiently at phosphorus influent concentrations less than about 1 mg/L, can use the process residual waste stream to improve plant operations and lower reactive-filtration influent phosphorus levels from high ranges (about 1-10 mg/L) to levels more advantageous for high-efficiency reactive filtration (i.e., less than about 1 mg/L). Standard water-treatment practice of using metal salt reagent addition in several places in the process stream as a coagulant or reactant for contaminant removal and water treatment typically lowers phosphorus levels to about 0.5-1.5 mg/L and has not been demonstrated to yield the very low levels achievable by tertiary reactive filtration (e.g., <0.030 mg/L). The use of the tertiary treatment residuals (i.e., metal salt residuals) to enhance plant TP/TSS/BOD removal, leverage higher-efficiency reactive filtration, and enhance solids management, all while limiting overall reagent chemical addition, is a process improvement.

The productive recycling of tertiary process residuals into primary or secondary wastewater treatment is an improvement to the reactive-filtration process. This recycling manages the residual waste stream of reactive filtration to enhance overall contaminant removal efficiency at a wastewater treatment plant. It is a "green chemistry" recycling application of a process byproduct that normally would be directly removed, often by another unit operation, for disposal as solid waste. For example, U.S. Pat. No. 6,426,005 shows an additional unit operation for treatment of waste streams from a tertiary treatment. This additional unit operation separates the residual waste solids from the process water. However, in this reference, the residual waste solids are not explored or proposed for reuse in the water treatment plant. Therefore, the present application is an improvement to that method. Other water-treatment methods that use metal salts, mixtures, or polymers in separation processes, such as tertiary treatment (e.g., sand or other media filtration, membrane filtration, ultrafiltration, magnetic removal of magnetized iron compounds, or other physical or mechanical methods); secondary processes (e.g., aerobic or anaerobic-suspended growth variations, aerobic or anaerobic attached-growth variations, biological nutrient-removal variations, lagoon systems, septic systems, physical-chemical systems, chemical oxidation, advanced oxidation, membrane filtration, or membrane bioreactors); and primary treatment (e.g., CEPT or primary coagulation and flocculation, grit removal, or sedimentation) may also benefit from immediate reuse and recycling of this metal hydroxide and oxide residual waste stream. This benefit may be a chemical, mechanical, or biological treatment benefit. Thus residual waste-stream reuse to enhance primary and secondary treatment, especially from tertiary treatment residuals, is an improvement on those tertiary treatment methods (membrane reactors and filtration, ultrafiltration, and other physical, mechanical, or chemical methods) especially when the methods use ferric iron to enhance contaminant removal.

The chemical and biological processes in a municipal wastewater treatment plant do not appear to release already sequestered phosphorus that is in the tertiary treatment residual waste stream. This is possibly due to the formation of thermodynamically stable iron phosphate compounds and minerals. Indeed, research has documented stable iron-phosphorus compound formation, and enhanced microbial and chemical processes in ferric iron-treated anaerobic and aerobic water treatment.

Since treatment plants are already optimized for biosolids removal, there is a cost savings to the overall tertiary treatment installation in that no additional solids management unit operations have to be installed. The mass balance of iron being placed into land-applied biosolids is not of concern as typical soils contain 10,000-50,000 mg/kg (i.e. 1-5 wt %) of total iron. The reactive-filtration treatment residuals have additional, unused reactive capacity that can be exploited by adding them back into the water-treatment train. This addition could occur before a primary or secondary treatment solids separation unit operation prior to the reactive-filtration step. Enhancement of contaminant removal efficiency such as the observed reduction in TSS, BOD, and TP before tertiary treatment suggests that an active feedback mechanism may be established wherein reagent ferric iron dosing in a tertiary treatment process is reduced in response to a stable level of ferric iron activity in primary and secondary processes. This reduction in reagent dosing will decrease operational costs. Additionally, the biosolids produced are more compact, dewater more easily, and result in less equipment failure in typical dewatering press operation. This additional improvement in overall plant operation results from recycling the ferric iron process residuals into the primary and secondary wastewater treatment operations.

The process improvement of recycling metal salt residuals from a tertiary and/or advanced treatment process is substantially different than the typical recycle of return activated sludge (RAS) from a clarifier, which may have been dosed with a metal salt reagent, to the biological treatment portion of a treatment plant. Recycle of RAS, even when a metal salt has been dosed, does not achieve the same contaminant removal efficiency as in embodiments of the present application (see e.g. U.S. patent application Ser. No. 10/853,472 entitled "Chemically Enhanced Primary Sludge Fermentation Method"). This may be due to insufficient reaction or release of the contaminant from less well-developed metal salt precipitates (i.e., less hydrolyzed, polymerized, and flocculated metal salts) in the complex competitive-chemistry microenvironment found in primary and secondary water treatment target waters. Indeed, the presence of iron residual solids as iron hydroxides and iron oxides may stimulate bioflocculation, granulation, and IRB activity due to the macroscopic (e.g., about 1-10 mm) solid surface. The addition of a tertiary and/or advanced treatment process is also an advantage since it provides an extra level of protection, or redundancy, from process failures or upsets in other operations in the plant.

Metal salts have been widely used as reagents for treatment of water; however, pre-activation or pre-hydrolysis of the metal is an improvement to the dosing of metal salt reagents to water. Pre-hydrolyzed metal salts such as polyaluminum chloride (PAX) have been produced for commercial use; however, the method of pre-hydrolyzing metal salts for immediate use within a water-treatment plant by using tertiary-treatment process water or side-stream water is an improvement over existing practice.

It is expected that addition of substantial ferric iron into primary and secondary wastewater-treatment processes will activate treatment-plant contact surfaces such as concrete, metal piping or other designed or available surfaces with active IRB biofilms. This activation will be enhanced by the formation of iron oxide coatings on these surfaces. One embodiment of the present application includes creation of additional designed or engineered surfaces in a water-treatment process for iron oxide deposition and subsequent IRB biofilm formation following ferric iron compound addition. These surfaces will typically have a high relative surface area and may be constructed of material of high, neutral, or low density (relative to water; sinking or floating media), that may include plastics, ceramics, gravel, fabrics, metals or other materials intended to provide a stable surface for iron oxide and biofilm development. In other embodiments, it is expected that added and consumable surfaces, usually small (e.g., from less than 1 mm to about 10 mm) and made of an appropriate material, intended to be removed in suspended or settled solids processing of the treatment plant, may be added in the initial stages of treatment as additional surfaces for iron oxide and biofilm development. It is viewed as advantageous that these added surfaces would also be recyclable and/or improve properties of the solids produced in a water-treatment process.

Besides municipal wastewater or sewerage treatment, other water- and wastewater-treatment applications, such as food-processing wastewater or industrial-process wastewater may benefit from this same process. Treatment processes that use metal salts in a solids separation step toward the front of the treatment train, as preliminary or primary treatment, can also be improved by practicing some of the embodiments of the present application as described herein.

In the above detailed description, reference is made to the accompanying drawings that form a part thereof, and in which is shown by way of illustration specific exemplary embodiments in which the inventive concepts may be practiced. These embodiments are described in sufficient detail to enable those skilled in the art to practice the inventive concepts, and it is to be understood that modifications to the various disclosed embodiments may be made, and other embodiments may be utilized, without departing from the spirit and scope of the present invention. The following detailed description is, therefore, not to be regarded as limiting in any way.

Unless otherwise indicated, all numbers expressing concentrations of contaminants or reagents, reaction conditions, separation conditions, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. At the very least, and not as an attempt to limit the application of the doctrine of equivalents to the scope of the claims, each numerical parameter should at least be construed in light of the number of reported significant digits and by applying ordinary rounding techniques. The numerical values set forth are reported as precisely as possible Any numerical value, however, inherently contains certain errors necessarily resulting from the standard deviation found in their respective testing measurements.

Conclusion

Although exemplary techniques, methods, devices, systems, etc., relating to contaminant removal from water streams have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A system comprising:
   a membrane filtration mechanism operable to receive an influent water stream containing a contaminant and to separate at least a first portion of the contaminant from a resulting first effluent water stream; and,
   a continuously regenerating radial moving bed media filter comprising a filter media having a metal salt reagent positioned on a surface of the filter media and further operable to receive the first effluent water stream effective that a second portion of the contaminant adheres to the metal salt reagent positioned on the surface, and wherein the continuously regenerating radial moving bed media filter is configured to clean the metal salt reagent and the adhering second portion of the contaminant from the surface in a waste stream while the cleaned filter media is recycled to receive additional first effluent water to continuously produce a resultant second effluent stream.

2. The system of claim 1, wherein the first effluent water stream contains a higher concentration of soluble forms of the contaminant than insoluble forms of the contaminant, and wherein a majority of the second portion includes forms of the contaminant that tend to be dissolved in the first effluent water stream.

3. The system of claim 2, wherein the reactive filtration mechanism is operable to convert at least some of the dissolved contaminant into particulate forms of the contaminant and to remove a majority of the particulate forms in the waste stream.

4. The system of claim 1, further comprising a mechanism operable to recycle at least a portion of the waste stream from the continuously regenerating radial moving bed media filter back into the influent water stream at a point upstream of the membrane filtration mechanism.

5. The system of claim 4, further comprising preliminary and secondary treatment mechanisms to generate the influent water stream received by the membrane filtration mechanism and wherein the mechanism operable to recycle is configured to recycle the waste stream upstream from the preliminary treatment mechanism.

6. The system of claim 4, wherein the waste stream provides a source of metal salt residuals that enhance average overall system contaminant removal efficiency subsequent to said recycling in comparison to average overall system contaminant removal efficiency prior to said recycling.

7. The system of claim 4, wherein average contaminant concentrations in the influent water stream at the membrane filtration mechanism decreases after said recycling commences.

8. The system of claim 7, wherein the preliminary treatment mechanism comprises a primary clarifier mechanism operable to remove solids from treatment water and wherein the waste stream is recycled upstream of the primary clarifier mechanism and wherein an amount of the recycled contaminant is separated by the primary clarifier mechanism from water continuing downstream toward the secondary treatment mechanism sufficient to cause the decreased contaminant concentration.

9. The system of claim 1, wherein a majority of the first portion includes contaminant containing compounds that tend not to be dissolved in the influent water and a majority of the second portion includes contaminant containing compounds that tend to be dissolved in the first effluent stream.

10. The system of claim 1, wherein the continuously regenerating radial moving bed media filter includes a mechanism operable to add the metal salt reagents to the first effluent water stream sufficient to generate metal salt residuals in the waste stream.

11. A system comprising:
a membrane filtration mechanism operable to receive an influent water stream containing a contaminant and to separate at least a first portion of the contaminant from a resulting first effluent water stream;
a continually regenerating moving bed radial reactive filtration media filter comprising a filter media and operable to receive the first effluent water stream and to remove a waste stream containing a second portion of the contaminant from a resultant second effluent stream while cleaning and recycling the filter media; and,
a mechanism operable to add metal salt reagents to the first effluent water stream sufficient to generate metal salt residuals in the waste stream and further comprising another mechanism operable to return at least a portion of the waste stream into the influent water upstream of the membrane filtration mechanism.

12. The system of claim 11, wherein the continually regenerating moving bed radial reactive filtration media filter includes the mechanism operable to add metal salt reagents.

13. The system of claim 11, wherein the mechanism operable to add metal salt reagents comprises a pre-reactor of the continually regenerating moving bed radial reactive filtration media filter.

14. The system of claim 11, wherein an amount of contaminant remaining in the second effluent stream decreases subsequent to the mechanism operable to return beginning to recycle the waste stream.

* * * * *